United States Patent [19]

Slayton et al.

[11] Patent Number: 4,746,955
[45] Date of Patent: May 24, 1988

[54] COLOR FILTER INTERPOSITIONING MECHANISM FOR COLOR ELECTROPHOTOGRAPHY

[75] Inventors: Dan L. Slayton, Lilburn; Wayne C. Jones, Duluth, both of Ga.

[73] Assignee: Colorocs Corporation, Norcross, Ga.

[21] Appl. No.: 907,987

[22] Filed: Sep. 16, 1986

[51] Int. Cl.$^4$ .................. G03B 27/72; G03B 27/76
[52] U.S. Cl. .................. 355/35; 350/315; 350/318; 355/71
[58] Field of Search .................. 355/4, 32, 35, 38, 71; 350/311, 313, 315, 316, 318

[56] References Cited

U.S. PATENT DOCUMENTS

| | | | |
|---|---|---|---|
| 3,458,254 | 7/1969 | Aston | 355/35 |
| 3,531,195 | 9/1970 | Tanaka et al. | 355/4 |
| 3,574,456 | 4/1971 | Grace | 355/4 |
| 3,775,006 | 11/1973 | Hartman et al. | 355/4 |
| 3,797,933 | 3/1974 | Sable | 355/35 |
| 3,963,341 | 6/1976 | Tully | 355/4 |
| 4,189,227 | 2/1980 | Barbieri | 355/35 |
| 4,528,685 | 7/1985 | Kump et al. | 350/315 X |

Primary Examiner—Fred L. Braun
Attorney, Agent, or Firm—Jones, Askew & Lunsford

[57] ABSTRACT

A color filter interpositioning mechanism for use in an electrophotographic print mechanism which uses motor driven pulleys to move a belt which is located directly beneath a grooved track into which the color filter assemblies are inserted. The belt contains spaced apart holes which are brought beneath the color filter assemblies, by the rotation of the belt about the pulleys, thus allowing a spring loaded pin, attached to each filter, to fall through a slot in the grooved track and into the hole. The filter assembly is then drawn down the track and into an optical path. A sensor detects when the filter is properly positioned in the optical path and signals the motor to stop. An image of the original to be copied is then projected through the filter and onto a photoreceptor. After the image is shot, the belt begins to move again and the forward-most pulley pushes the spring-loaded pin back into its housing, allowing a retracting spring attached to the color filter assembly to draw the assembly back down the track into its original position. This process is repeated for all the color filter assemblies before transfer of the image to an image receptor and the completion of copying process. The use of the belt and sensor system dispenses with the need for finely machined parts and this in combination with the retracting spring allows the whole mechanism to be much smaller, thus allowing for a much smaller print mechanism.

10 Claims, 2 Drawing Sheets

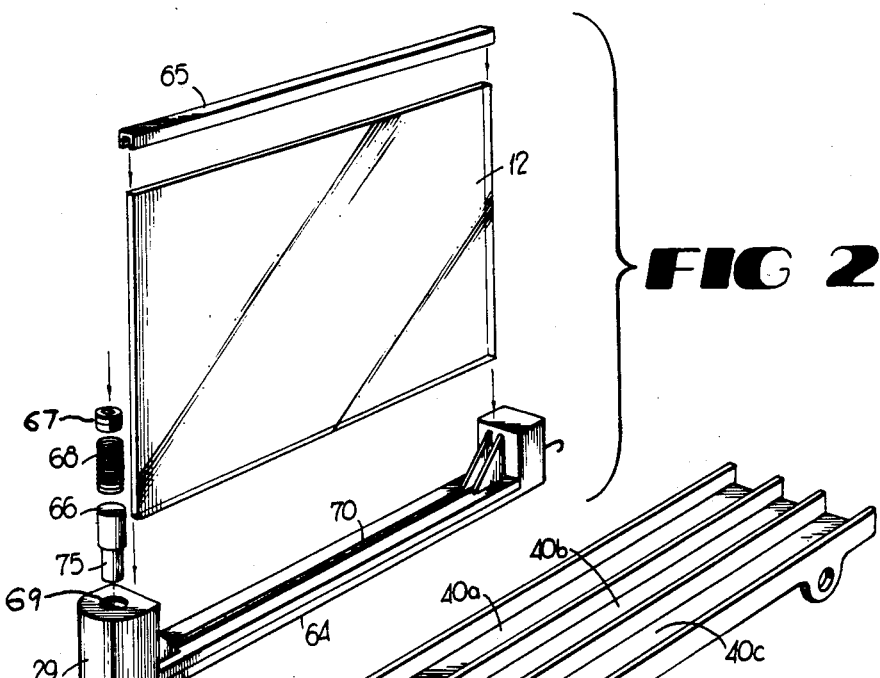
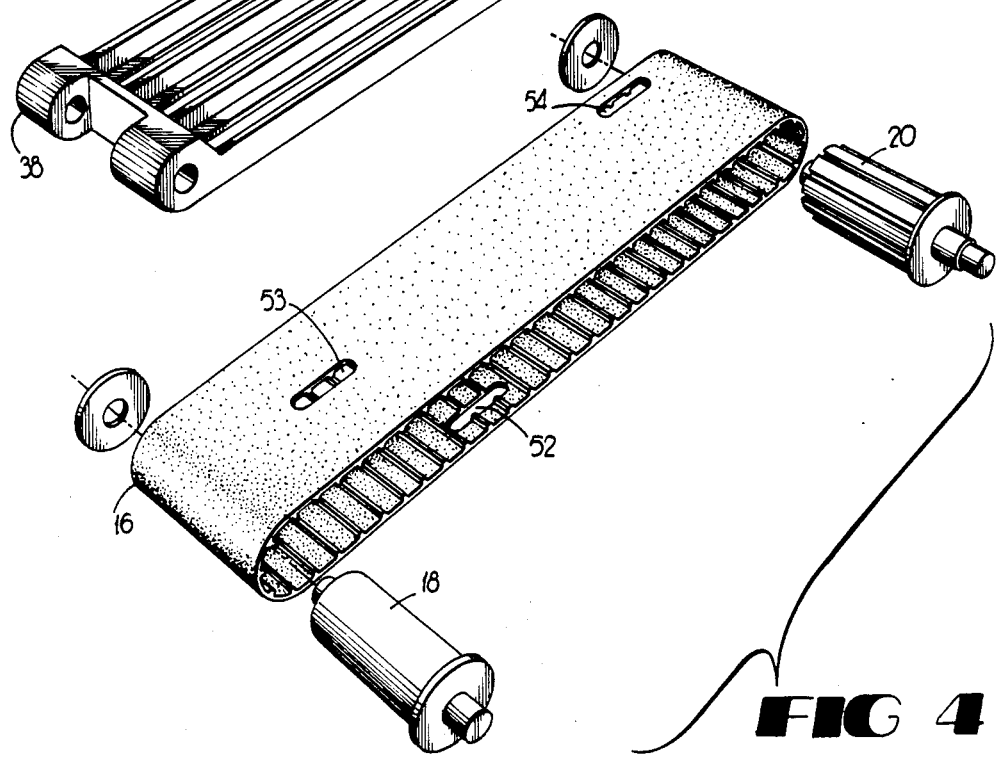

COLOR FILTER INTERPOSITIONING MECHANISM FOR COLOR ELECTROPHOTOGRAPHY

TECHNICAL FIELD

The present invention relates to color electrophotography and, in particular, is an improved mechanism for selectively interposing color separation filters in an electrophotographic print engine.

BACKGROUND OF THE INVENTION

This invention relates generally to a system for selectively interposing color separation filters in an electrophotographic print mechanism or engine for the making of color copies, and relates particularly to a system in which the individual color filter assemblies are drawn into an optical path by a belt running beneath a track which extends from the optical path to the home position of the filter assemblies.

The electrophotographic print engine is a machine that is used for making xerographic, i.e. dry copies. The process used to make xerographic copies and color xerographic copies is well known in the art. The print engine makes the copy by focusing an optical image of an original to be copied onto an electrically charged photosensitive medium known as a photoreceptor. This process creates an electrostatic charge on the photoreceptor in the image of the original. This image is passed near to a source of toner materials which are attracted to the electrostatic image and migrate to the image. The image is then transferred to an image receptor, which is usually a sheet of paper. The image receptor is then passed through a fusing device that melts the toner, which is usually a plastic that melts at a predetermined temperature, onto the image receptor, thus creating the xerographic copy.

In order to create a color copy of the original, a set of color separation filters are individually interposed in the optical path between the optical image and the photosensitive medium. A different color toner, which corresponds to each filter, is used. The electrostatic image is passed near to the toner which corresponds to the color filter which was first interposed in the optical path. The developed image is then transferred to the image receptor. However, in full color electrophotography, instead of immediately passing the image receptor through the fuser, the process of transferring the image of the original to the image receptor is repeated for each filter. Normally, there are three different colored filters and three different color toners. Only then is the image receptor passed through the fuser and the color copy results. Therefore, it can be seen that the mechanism for selectively interposing the color filters in the optical path is of prime importance in an electrophotographic print engine designed for making color xerographic copies.

The typical system for selectively interposing color filters in an electrophotographic print engine involves placing the color filters in a large disc and then rotating the disc around a central axis, through the use of a motor of a type well known in the art, so that the filters are sequentially positioned in an optical path. The optical image of the item to be printed can then be focused through the filter onto a photoreceptor. This process is repeated for each color filter until a full color image is placed on the photoreceptor. The image is then transferred onto a medium for receiving the copy such as paper or transparent plastic.

Another system used for selectively interposing color filters is a mechanism in which the color filters are attached about a single rod. The filters radiate out from the rod in a spaced apart manner. To selectively interpose the color filters, the rod is rotated, again through the use of a motor of a type well known in the prior art, so as to sequentially position the color filters in the optical path. The color image is then placed on the photoreceptor in the manner well known in the art.

Both of these systems suffer from distinct disadvantages. Both systems require a great deal of room to operate, creating limitations on possible size reduction of the print engine and causing the print engine to occupy a significant amount of space in the use area. This in turn results in an increase in the weight of the print engine. Another problem with these systems is that the increase in size and weight increases the power consumption necessary to operate the print engine. These systems also require precise machining of the component parts to position the filter in the correct place in the optical path, increasing the likelihood of malfunction of the system. All these disadvantages have the necessary result of an increase in the cost of the print engine.

Thus, there is a need for a smaller, less cumbersome system for interposing color filters in an electrophotographic print engine which requires a minimal amount of power to operate and a minimal amount of precise machining in the manufacture of the system.

SUMMARY OF THE INVENTION

The present invention solves the above described problems in the prior art by providing a mechanism for interposing color filters in an electrophotographic print engine that can fit into a small space, is powered by a single electric motor, and is comprised of non-critically machined parts.

Generally described, the improved color filter interpositioning mechanism of the present invention comprises a set of color filter assemblies, a grooved track, a belt positioned below the grooved track and connected to a motor, and a set of optical filters positioned above the grooved track at the position across which the optical path of the electrophotographic print engine passes.

The color filter assemblies comprise a color filter, a frame for holding the color filter rigid, a spring-loaded pin connected to the frame, and a retracting spring device connecting the filter assembly to a stationary object at the end of the track. Each color filter assembly is inserted into a grooved track, each track containing a slot in the bottom of the track which runs approximately one-half the length of the track. The belt, positioned directly below the grooved track, contains a set of holes, equal to the number of filters, each hole being spaced apart along the length and width of the belt, the belt being driven about a pair of pulleys positioned at both ends of the track by the electric motor.

As the belt is rotated about the pulleys by the electric motor, each of the holes will be drawn beneath a color filter assembly in a sequential fashion. The pin, which is connected to the filter assembly, protrudes through the slot in the track and rides on top of the belt. As the hole in the belt moves underneath the pin, the spring forces the pin into the hole in the belt. As the belt continues to move, the filter is thereby drawn across the track into the optical path. The optical sensor, placed above the optical path at the position where the optical path intersects the track, will detect when the filter is properly placed in the optical path. The optical sensor then signals the motor, through a central controller, to stop moving the belt while an image of the original is projected through the color filter onto the photoreceptor.

When the image has been shot, the motor will then once again begin driving the belt, pulling the filter assembly forward into the foremost pulley. The pin will be forced back through the hole in the belt and into its housing by the contact with the pulley. This, in turn, allows the retracting spring, attached to the filter assembly and anchored at the end of the track, to pull the filter assembly back down the track into its original position. This process is repeated sequentially for each filter.

The improved design of the present invention allows the filter mechanism to be placed in a much smaller space by allowing placement of the filters in a side-by-side fashion. The filters are placed in the optical path by the compact system of a belt and pulleys and returned to their original position by a spring mounted on the filter assembly. This design also requires much less precision in the manufacture of its various parts because it relies on optical sensors and a central control to stop the filters when they are correctly positioned in the optical path. There is no need for precision machinery to prevent the filters from being positioned incorrectly in the optical path. This results in an overall reduction in the manufacturing costs of the machine.

Also, the present invention can be used in print engines which stroboscopically shoot an entire image, and engines which scan an image through a relatively narrow optical path.

Thus, it is an object of the present invention to provide a mechanism for color xerography in an electrophotographic print engine.

It is also an object of the present invention to provide an improved color filter interpositioning mechanism.

It is another object of the present invention to provide a color filter interpositioning mechanism that can be used in print engines which utilize both stroboscopic and scan type light sources.

It is a further object of the present invention to provide a color filter interpositioning mechanism that requires significantly less space in the electrophotographic print engine.

It is also an object of the present invention to provide a color electrophotographic print engine of a size approximately equal to that of a conventional monochrome desktop size electrophotographic print engine.

It is an even further object of the present invention to provide a color filter interpositioning mechanism that does not require precision machined parts to control the movement of the color filter assemblies.

It is also an object of the present invention to provide a color filter interpositioning mechanism that is less expensive to manufacture.

Other objects, features, and advantages of the present invention will become apparent from reading the following specification when taken in conjunction with the accompanying drawings.

BRIEF DESCRIPTION OF THE DRAWINGS

FIG. 2 is a perspective view of a color filter assembly, disassembled.

FIG. 3 is a perspective view of the grooved tracks showing the slots cut in the bottom of the tracks.

FIG. 4 is a perspective view of the belt and pulley system, showing the holes in the belt.

DETAILED DESCRIPTION

Figure 1:
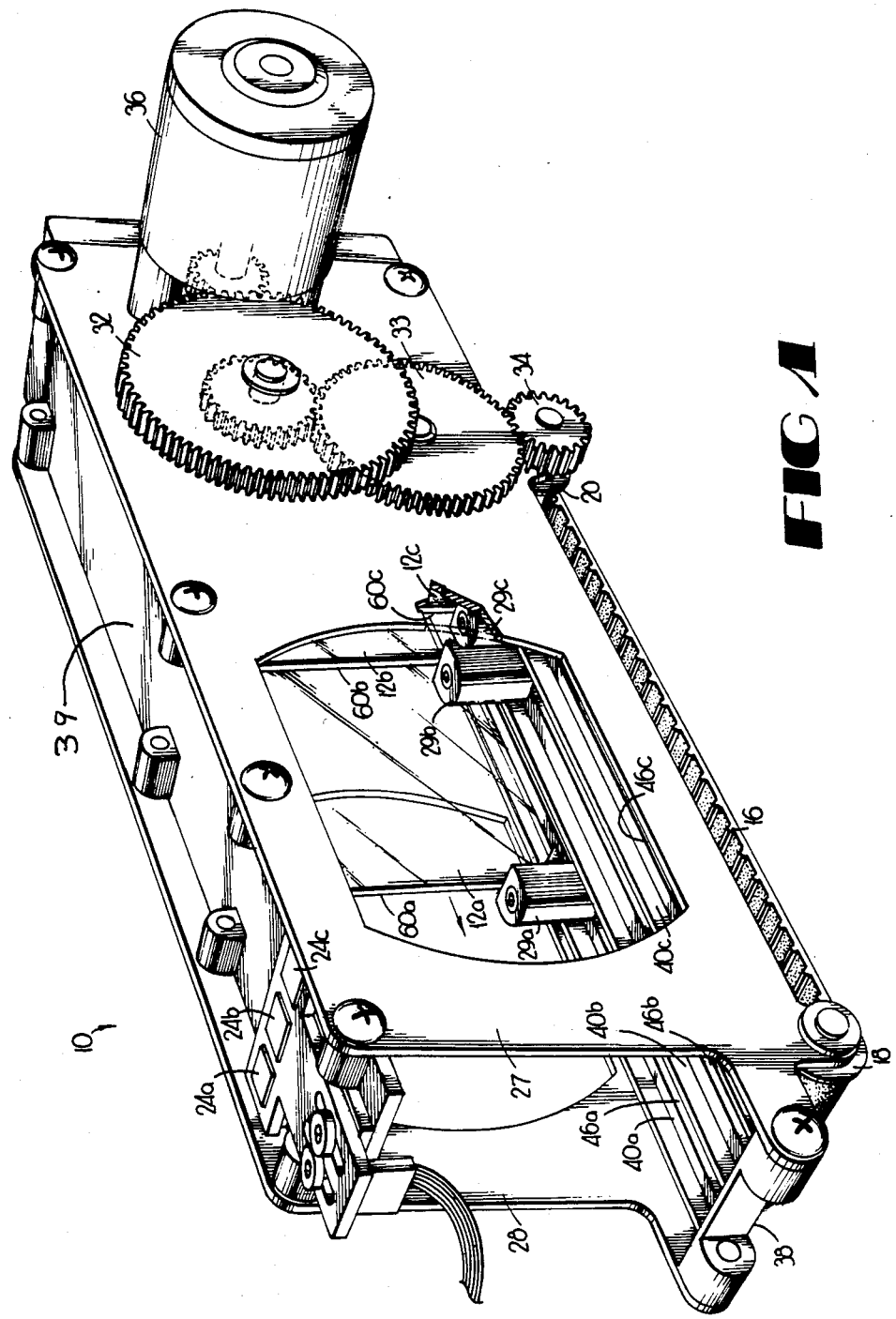
FIG. 1 is a perspective view of the color filter interpositioning apparatus.

Turning now to the various figures, in which like numerals indicate like parts throughout the several drawings, a detailed description of the preferred embodiment will be provided. The present invention was designed to be used in a print engine of the type shown in co-pending application Ser. No. 791,218 entitled "Improved Print Engine for Color Electrophotography" filed Oct. 25, 1985, which is assigned to the assignee of the present invention. The preferred embodiment of the color filter interpositioning apparatus is shown generally at 10 in FIG. 1. It is installed in an electrophotographic print engine in such a way that the optical path of the print engine passes substantially perpendicular to the grooved track and underneath the optical sensors 24a, 24b, and 24c. The color filter interpositioning apparatus comprises a front panel 28 and rear panel 27, encasing the apparatus, optical sensors 24a, 24b, and 24c, two grooved track guides 38 and 39, three color filter assemblies 60a, 60b, and 60c which includes three colored filters (usually red, green and blue), a belt 16 and pulleys 18 and 20, and a motor 36 connected through gears 32, 33 and 34 to pulley 20.

In response to a signal from a central controller (not shown) of a type known in the art, motor 36 will turn gear 32 in a manner generally known in the art. Gear 32 will cause gear 33 to turn and gear 33 will cause gear 34, connected to pulley 20 to turn, thus causing belt 16 to rotate about pulley 18 and pulley 20.

FIG. 2 is a perspective view of a color filter assembly, disassembled. Pin 66 and spring 68 are contained within pin housing 29. Spring 68 exerts pressure on pin 66 so that spring 68 normally forces pin extension 75 of pin 66 to protrude from pin housing 29. A set screw 67 screws into hole 69 and contains pin 66 and spring 68 within pin housing 29. Set screw 67 may also be used to vary the compression of spring 68. Color filter 12 is contained by top filter holder 65 and bottom filter holder 64. Bottom filter holder 64 also includes pin housing 29.

FIG. 3 is a perspective view of the lower grooved track guide showing the slots cut in the bottom of the tracks. There are three tracks, 40a, 40b, and 40c, and each track has a slot, 46a, 46b, and 46c, respectively. The upper grooved track guide 39 (FIG. 1) is similar to lower grooved track guide 38 but does not have slots 46a, 46b, and 46c.

FIG. 4 is a perspective view of the belt and pulley system, showing the holes in the belt. The belt 16 has three holes 52, 53, and 54. The belt 16 is driven by pulley 20.

Refer now to FIGS. 2, 3, and 4. As belt 16 rotates about pulleys 18 and 20, hole 52, (FIG. 4) will be drawn underneath filter assembly 60c (FIG. 2). Pin spring 68 then forces pin extension 75 through slot 46c in grooved track 40c (FIG. 3) and into hole 52. As belt 16 continues to move, filter assembly 60c will be drawn into the optical path. When filter assembly 60c is correctly positioned in the optical path, optical sensor 24c will signal motor 36, through the controller (not shown), to stop.

When filter assembly 60c is stationary in the optical path, an image of the original to be copied will be projected through filter 12c onto a photoreceptor (not shown) of a kind well known in the art. The motor 36 will then be signaled to resume moving belt 16, pulling filter assembly 60c over pulley 18. As pin extension 75 contacts pulley 18, pin extension 75 will be forced back into pin housing 29 by pulley 18, compressing pin spring 68. This releases the force holding filter assembly 60c aligned with hole 52 allowing retracting spring 70 to draw filter assembly 60c back down grooved track 40c into its original position. In the preferred embodiment of the present invention, the travel of filter assembly 60c is stabilized not only by grooved track 42c, but also by a grooved track (not shown) in grooved top guide 39 in the upper portion of the color filter interpositioning apparatus which helps to prevent lateral movement of the filter assembly.

As motor 36 continues to move belt 16 about pulleys 18 and 20, hole 53 will move underneath filter assembly 60b, thus pulling it into the optical path in like manner as with filter assembly 60c. When filter assembly 60b is properly positioned in the optical path, optical sensor 24b will signal motor 36 to stop while the image of the same original is projected through filter 12b onto the photoreceptor. Then the motor will resume operation, causing pin extension 75 to be forced back into pin housing 29b, thus allowing filter assembly 60b to be drawn back down grooved track 40b into its original position. This same process is repeated for filter assembly 60a, thus allowing a full color image of the original to be reproduced by the electrophotographic print engine.

It is noted that the combination of motor 36, belt 16 and pulleys 18 and 20 correspond to the means for moving the color filter assemblies 60a, 60b, and 60c into said optical path and that the pulley 18 and retracting spring 70 correspond to the means for removing each of said color filter assemblies from said optical path in claim 1. It should also be noted that the tracks 38 and 39 correspond to the means for holding said filter assemblies in a laterally spaced apart relationship, also of claim 1.

It should be understood that the foregoing relates only to a preferred embodiment of the present invention and that numerous modifications or alterations may be made therein without departing from the spirit and scope of the invention as set forth in the appended claims.

We claim:

1. An apparatus in an electrophotographic print mechanism, for a selectively interposing color filters comprising:
   a plurality of color filter assemblies, disposed for movement into an optical path;
   means for moving each of said filter assemblies into said optical path, said means including an endless belt moveable in a circuitous path to selectively engage and move, one at a time, each filter assembly of said plurality of filter assemblies; means for removing each of said filter assemblies from said optical path; and
   means for holding said color filter assemblies in a laterally spaced apart relationship.

2. The apparatus of claim 1, wherein said means for moving said color filter assemblies into said optical path comprises:
   a plurality of grooved tracks having first and second sides into which color filters are inserted, a portion of the second of the sides of said track having been removed so as to form a slot in the bottom of said track, said moveable belt having a plurality of spaced apart holes and being positioned underneath said tracks; and
   driving means for said moveable belt.

3. The apparatus of claim 2, wherein each of said color filter assemblies comprises:
   a pin, connected to said holding means, disposed for movement in a direction perpendicular to said direction of travel of said movable belt.

4. The apparatus of claim 3, wherein:
   said spaced apart holes are spaced apart along a direction of travel of said movable belt and also spaced apart in a direction perpendicular to said direction of travel so that each of said holes becomes aligned with a respective one of said pins in response to movement of said belt by said driving means.

5. The apparatus of claim 2 wherein said driving means for driving said belt comprises:
   a plurality of pulleys around which said belt is placed; and
   a means for driving said pulleys.

6. The apparatus of claim 1 wherein the means for removing said color filter assemblies from said optical path comprises:
   a spring attached to said color filter assembly.

7. The apparatus of claim 1 further comprising:
   detecting means for detecting the position of said filters in said opticl path.

8. The apparatus of claim 7 wherein said detecting means comprises:
   a photocell, said photocell being positioned above said optical path.

9. An apparatus in an electrophotographic print mechanism for selectively interposing color filters comprising:
   a plurality of color filters, disposed for movement into an optical path;
   spring means attached to each of said color filters, urging it to a home position;
   means for holding said color filters side-by-side;
   a moveable belt, having a plurality of spaced apart holes, said spaced apart holes being spaced apart along a direction of travel of said moveable belt and also spaced apart in a direction perpendicular to said direction of travel, said moveable belt passing under said holding means; and
   a pin attached to each of said holding means, said pin disposed for movement in a direction substantially perpendicular to the direction of travel of said belt, said pin passing though the surface of said belt; whereby:
   said pin attached to said holding means passes through a respective spaced apart hole in said moveable belt when said hole passes underneath said pin, causing said color filter to move with said belt into said optical path and then be returned to said home position by said spring means.

10. An apparatus in an electrophotographic print mechanism, for selectively interposing color filters comprising:
    a plurality of color filter assemblies, disposed for movement into an optical path;
    means for moving each of said filter assemblies into said optical path, said means including a plurality of grooved tracks having first and second sides into which said color filters are inserted, a portion of the second of the sides of said track having been removed so as to form a slot in the bottom of said track, said means including a moveable belt having a plurality of spaced apart holes and being positioned underneath said tracks;

means for removing each of said filter assemblies from said optical path;

means for holding said color filter assemblies in a laterally spaced apart relationship;

a pin, connected to said holding means, disposed for movement in a direction perpendicular to said direction of travel of said moveable belt; and driving means for said moveable belt, said spaced apart holes in said moveable belt are spaced along a direction of travel of said moveable belt and also spaced apart in a direction perpendicular to said direction of travel so that each of said holes becomes aligned with a respective one of said pins in response to movement of said belt by said driving means.

* * * * *